United States Patent Office 3,020,968
Patented Feb. 13, 1962

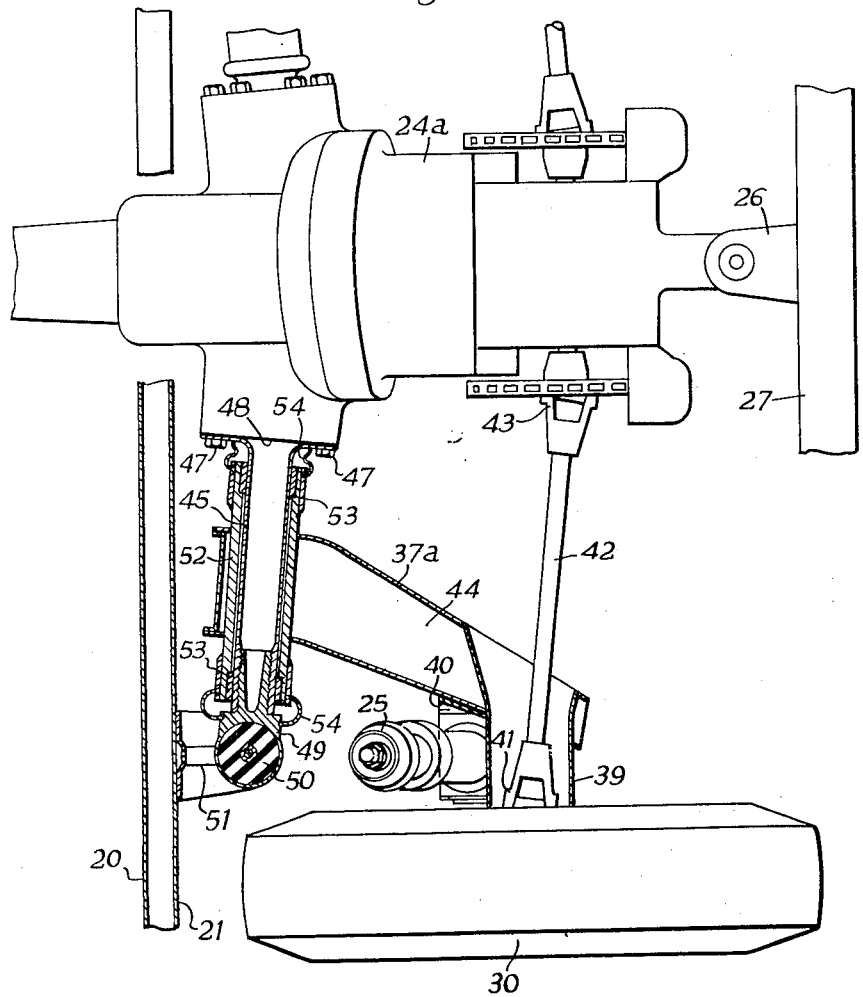

3,020,968
AUTOMOBILE WHEEL SUSPENSION SYSTEMS
Achille Carlos Sampietro, 286 Puritan,
Birmingham, Mich.
Filed Dec. 16, 1957, Ser. No. 703,093
Claims priority, application Great Britain Dec. 19, 1956
8 Claims. (Cl. 180—73)

This invention relates to automobile vehicles of the kind in which the rear wheels are driven through a differential gearing unit mounted on the frame of the vehicle, and relates more particularly to suspension systems for the rear wheels of such vehicles.

In conventional vehicles of this kind, each rear wheel is mounted for movement in a vertical plane with respect to the frame of the vehicle and the driving connection between the wheel and the differential gearing, which is fixed relative to the frame, includes a spline coupling to compensate for the variation in distance between the hub of the wheel and the differential gearing during vertical movement of the wheel.

An object of the invention is to provide a rear wheel suspension system that affords the wheel a degree of freedom of lateral movement, that is movement towards and away from the centre line of the vehicle, during its vertical movements in response to varying road pressure, thereby avoiding the necessity for providing a spline coupling in the driving connection between the wheel and the differential gearing.

Another object of the invention is to provide a simplified construction for a rear wheel suspension system in which the driving connection between the wheel and the differential gearing also serves to locate the wheel laterally of the vehicle.

According to the invention there is provided a rear wheel suspension system in an automobile vehicle having a frame and a differential gearing unit mounted on said frame, said system comprising a swing axle mounted for angular movement about an axis fixed relative to said frame and capable of limited movement in the direction of said axis, said swing axle having an end portion carrying a rear wheel, and drive means of fixed length, including a drive shaft and universal joints, drivably coupling said rear wheel to said differential gearing unit, said drive means axially locating the swing axle on said axis.

The invention will now be described by way of example with reference to the accompanying drawings, in which:

FIG. 3 is a plan view of a modified arrangement of the suspension system of FIG. 2, FIG. 3 being on the same scale as FIG. 2.

Figure 1:
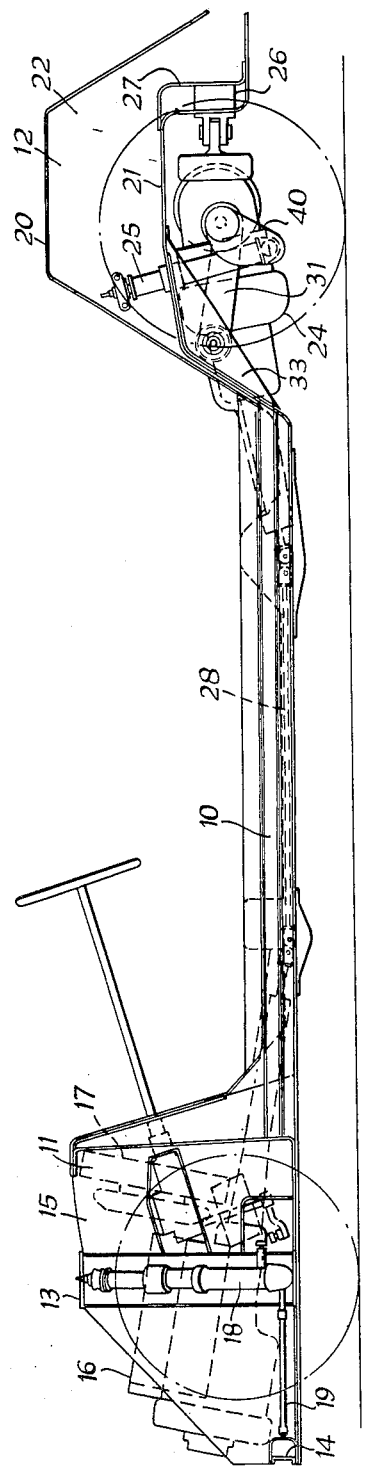
FIG. 1 is a view in side elevation of the chassis of an automobile vehicle incorporating a rear wheel suspension system according to the invention.

Referring to FIG. 1, the chassis illustrated comprises a double skinned frame 10 having a front extension 11 and a rear extension 12. The front extension 11 comprises an inverted U-shaped yoke piece 13 and a front cross member 14 carried by side plates 15 welded to the frame, and the front extension supports an engine 16, a radiator 17, two front wheel spring units 18 (only one of which is shown) and the linkage 19 of the front wheel suspension system. The rear extension 12 comprises two sheet metal skins 20, 21 spaced apart and reinforced by two side plates 22 and by a rear cross member not illustrated, and the rear extension supports a change speed and differential gearing unit 24, two rear wheel spring units 25 (only one of which is shown), and the linkage for the rear wheel suspension system. The change speed and differential gearing unit 24 is arranged between the two rear wheels of the vehicle and is detachably mounted at its rear end on a bracket 26 secured to a further cross member 27 welded to the underskin 21 of the rear extension 11 of the frame. The driving connection between the engine 16 and the change speed and differential gearing unit 24 includes a horizontal propeller shaft 28 which is disposed between the skins forming the frame 10.

The construction of the frame does not form part of the present invention and is therefore not illustrated in detail, but the construction of the frame is preferably as shown and described in the specification of my co-pending patent application Ser. No. 701,583, filed Dec. 9, 1957, now Patent No. 2,963,106.

Figure 2:
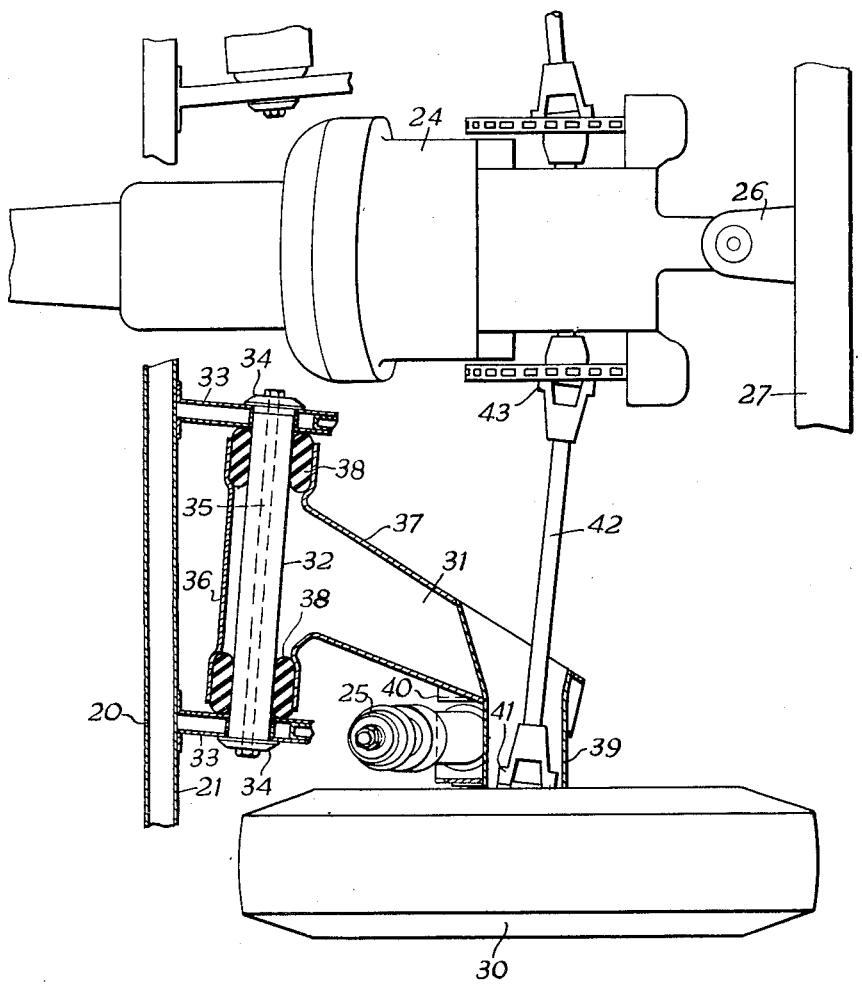
FIG. 2 is a plan view, on a larger scale than FIG. 1, of the change speed and differential gearing unit, and (in section) the suspension system of one rear wheel of the chassis of FIG. 1, the suspension system for the other rear wheel being omitted for compactness.

Referring now to FIG. 2, a rear wheel 30 is mounted at the free end of a swing axle 31 which is mounted for angular movement with respect to the frame of the vehicle. The mounting for the swing axle 31 comprises a tubular spindle 32 arranged with its medial radial plane inclined outwardly and rearwardly at a small angle to the centre line of the vehicle. The ends of the spindle 32 are located in coaxial apertures in two spaced brackets 33 welded to the underskin 21 of the rear extension 12 of the frame, and the spindle 32 is held in position on the brackets 33 by two end caps 34 which are screwed to the ends of a rod 35 extending through the tubular spindle 32 and which engages the outer surfaces of the two brackets 33.

The swing axle 31 comprises a housing 36 surrounding the spindle 32 and a hollow arm 37 formed integral with the central portion of the housing 36. The housing 36 is spaced radially from the spindle 32 and the ends of the housing 36 are spaced from the adjacent brackets 33. The end portions of the housing 36 are of greater diameter than the central portion, and enclose rubber sleeves 38 which are held firmly between the spindle 32 and the said end portions of the housing 36. The sleeves 38 extend axially outwards from the ends of the housing 36 and abut against the brackets 33.

The arm 37 extends rearwardly from the housing 36 and is inclined downwardly and outwardly. The arm 37, which as shown tapers towards its lower end, is provided with an outwardly projecting tubular extension piece 39 located in opposed apertures at the lower end of the arm 37, and with a downwardly projecting bracket 40 welded to the arm 37 immediately in front of the extension piece 39.

The bearing housing of the wheel 30 is rigidly secured to the outer end of the extension piece 39 and the hub of the wheel is drivably connected by a universal joint 41 to a drive shaft 42 which extends through the tubular extension piece 39. The drive shaft 42 is connected by a further universal joint 43 to the associated output element of the differential gearing of unit 24, and the arrangement of the unit 24 and the swing axle 31 is such that the shaft 42, when in the normal rest position, is substantially parallel to the spindle 32.

The suspension system for the wheel 30 thus comprises the swing axle 31 which constrains the wheel for angular movement at a substantially constant radial distance about the axis of the spindle 32, and the drive shaft 42 which retains the wheel hub at a fixed distance from the universal joint 43 adjacent the unit 24. During vertical movements of the wheel, the swing axle 31 is moved laterally towards and away from the centre line of the vehicle due to the invariable length of the connection between the wheel hub and the unit 24, the resilient rubber sleeves 38 providing the necessary freedom of movement of the swing axle along the spindle 32.

The springing of the swing axle 31 is effected by a spring unit 25, the lower end of which is pivotally connected to the bracket 40 and the upper end of which is pivotally connected to the adjacent reinforcing side plate 22 of the rear extension 12 of the frame. The spring unit 25 may be of any suitable form, such as a coil spring or air bellows, but is preferably a hydropneumatic arrangement as disclosed in my co-pending patent application Ser. No. 703,628, filed Dec. 18, 1957.

The suspension system shown in FIG. 3 is a modified arrangement of the system of FIG. 2, and like reference numerals denote like parts in these two figures. In FIG. 3 the rear wheel 30 is mounted at the free end of a swing axle 44 mounted for angular movement on a spindle 45. The spindle 45 is formed from a tube, the walls of which are turned outwards at one end to form an annular flange which is clamped by bolts 47 to a flat side surface 48 on a change speed and differential gearing unit 24a corresponding to the unit 24 of FIG. 2. The spindle 45 is arranged with its medial radial plane inclined outwardly and rearwardly at a small angle to the centre line of the vehicle and the outer end of the spindle 45 is supported on a plug 49 screwed into the spindle 45. The plug 49 is mounted upon a cylindrical rubber block 50 which is supported by a bracket 51 welded to the underskin 21 of the rear extension 11 of the frame.

The swing axle 44 comprises a cylindrical sleeve 52 surrounding the spindle 45 and a hollow arm 37a welded to the central portion of the sleeve 52. The ends of the sleeve 52 are spaced inwards from the ends of the spindle 45 and the sleeve 52 is spaced radially from the spindle 45, on which it is mounted by means of two bearings 53 located in recesses in the end portions of the sleeve 52. The bearings 53 are preferably made of Teflon or other self-lubricating material, and are protected from dust and road dirt by two flexible sleeves 54 connected between the ends of the housing 52 and the adjacent plug 49 and flange 46 respectively.

The arm 37a is similar in construction and arrangement to the arm 37 of FIG. 2 and is provided with an extension piece 39 and a bracket 40 for the support of a spring unit 25 all as previously described with reference to FIG. 2. The wheel hub is drivably connected by a drive shaft 42 and universal joints 41, 43 to the output element of the unit 24a, and during vertical movements of the wheel 30 the drive shaft 42 pivots about the universal joint 43 and moves the swing axle 44 laterally towards and away from the centre line of the vehicle, the spacing between each end of the sleeve 52 and the adjacent end of the spindle 45 providing the necessary freedom of movement of the housing 52 along the spindle 45.

What I claim is:

1. In an automobile vehicle having a chassis assembly including a frame and a differential gearing unit mounted on the frame, a rear wheel suspension system comprising a swing arm; pivot means for mounting said arm on the chassis assembly, said pivot means permitting angular movement of the swing arm relative to the assembly and translational movement of the swing arm along said pivot means; a stub axle carried by the swing arm; a rear wheel mounted on the stub axle; spring means supporting the assembly on the swing arm; and drive means of fixed length, including a drive shaft and at least two universal joints, drivably coupling the rear wheel to the differential gearing unit, said drive means axially locating the swing arm on said pivot means.

2. In an automobile vehicle having a chassis assembly including a frame and a differential gearing unit mounted on said frame, a rear wheel suspension system comprising: a spindle mounted on the assembly and arranged with its medial radial plane inclined rearwardly and outwardly with respect to the longtudinal center line of the vehicle; a swing arm pivotally mounted on said spindle and capable of movement axially along the spindle; a stub axle carried by the swing arm; a rear wheel mounted on said stub axle; spring means supporting the assembly on the swing arm; and drive means of fixed length, including a drive shaft and at least two universal joints, drivably coupling the rear wheel to the differential gearing unit, said drive means axially locating the swing arm on said spindle.

3. In an automobile vehicle having a chassis assembly including a frame and a differential gearing unit mounted on said frame, a rear wheel suspension system comprising: spaced support members mounted on the assembly; a spindle mounted upon and extending between said support members; a swing arm pivotally mounted on the spindle, the swing arm being spaced from said support members whereby the swing arm is afforded freedom of movement axially along the spindle; a stub axle carried by the swing arm; a rear wheel mounted on said stub axle; spring means supporting the assembly on the swing arm; and drive means of fixed length, including a drive shaft and at least two universal joints, drivably coupling the rear wheel to the differential gearing unit, said drive means axially locating the swing arm on said spindle.

4. In an automobile vehicle having a chassis assembly including a frame and a differential gearing unit mounted on said frame, a rear wheel suspension system comprising: a pair of support members mounted on the frame; a spindle mounted upon and extending between said support members, said spindle being arranged with its medial radial plane inclined rearwardly and outwardly with respect to the longitudinal center line of the vehicle; a swing arm formed with a sleeve at the front end thereof, said sleeve surrounding the spindle and having enlarged end portions spaced from said two support members; at least two tubular elements of resilient material surrounding said spindle and clamped one between each of said enlarged end portions and said spindle, said sleeves of resilient material abutting against the respective support members and by their resilience permitting pivotal movement of the swing arm about the spindle and translational movement of the swing arm axially along said spindle; a stub axle carried by the rear end of the swing arm; a rear wheel mounted on said stub axle; spring means supporting the assembly on the swing arm; and drive means of fixed length, including a drive shaft and at least two universal joints, drivably coupling the rear wheel to the differential gearing unit, said drive means axially locating the swing arm on said spindle.

5. In an automobile vehicle having a frame and a differential gearing unit mounted on the frame, a rear wheel suspension system comprising: two support members spaced apart on the frame, said support members having two coaxial apertures; a tubular spindle arranged with its ends located in said apertures; a rod disposed within said spindle; caps connected one to each end of said rod and abutting against the outer surfaces of the two support members; a swing arm formed with a sleeve at the front end thereof, said sleeve surrounding the spindle and having enlarged end portions spaced from said two support members; at least two tubular elements of resilient material surrounding said spindle and clamped one between each of said enlarged end portions and said spindle, said sleeves of resilient material abutting against the respective support members and by their resilience permitting pivotal movement of the swing arm about the spindle and translational movement of the swing arm axially along said spindle; a stub axle carried by the rear end of the swing arm; a rear wheel mounted on said stub axle, spring means supporting the assembly on the swing arm; and drive means of fixed length, including a drive shaft and at least two universal joints, drivably coupling the rear wheel to the differential gearing unit, said drive means axially locating the swing arm on said spindle.

6. In an automobile vehicle having a frame and a change speed and differential gearing unit mounted on the frame, a rear wheel suspension system comprising: a spindle having one end mounted on said unit and the other end mounted on the frame; a swing arm pivotally mounted on said spindle and capable of movement axially along the spindle; a stub axle carried by the swing arm; a rear wheel mounted on said stub axle; spring means supporting the assembly on the swing arm; and drive means of fixed length, including a drive shaft and at least two universal joints, drivably coupling the rear wheel to the differential gearing unit, said drive means axially locating the swing arm on said spindle.

7. A rear wheel suspension system as set forth in claim 6, wherein said spindle is a tube having an annular flange at one end thereof secured to said change speed and differential gearing unit, and including a plug secured in the other end of said tube, and a resilient block supporting the plug on the frame.

8. In an automobile vehicle having a frame and a change speed and differential gearing unit mounted on said frame, a rear wheel suspension system comprising: a spindle having one end mounted on said unit and the other end mounted on the frame, said spindle being arranged with its medial radial plane inclined rearwardly and outwardly with respect to the center line of the vehicle; a swing arm formed with a sleeve at the front end thereof, said sleeve surrounding the spindle; at least two self-lubricating bearings disposed between the sleeve and the spindle and mounted in recesses in the ends of the sleeve, the ends of the sleeve being spaced inwardly from the ends of the spindle whereby the swing arm is capable of both pivotal and translational movement on the spindle, a stub axle carried by the rear end portion of the swing arm, a rear wheel mounted on said stub axle, spring means supporting the assembly on the swing arm, and drive means of fixed length, including a drive shaft and at least two universal joints, drivably coupling the rear wheel to the differential gearing unit, said drive means axially locating the swing arm on said spindle.

References Cited in the file of this patent

UNITED STATES PATENTS

| | | |
|---|---|---|
| 1,094,094 | Parnacott | Apr. 21, 1914 |
| 1,856,647 | Lord | May 3, 1932 |
| 1,913,513 | Rossman | June 13, 1933 |
| 1,946,948 | Roos | Feb. 13, 1934 |
| 2,053,869 | Haltenberger | Sept. 8, 1936 |
| 2,689,015 | Nallinger | Sept. 14, 1954 |
| 2,775,467 | Kraus | Dec. 25, 1956 |
| 2,806,542 | Scherenberg | Sept. 17, 1957 |